(12) United States Patent
Grimmeisen

(10) Patent No.: US 7,963,814 B2
(45) Date of Patent: Jun. 21, 2011

(54) ELECTRIC MOTOR-DRIVEN WATER CRAFT, WHICH IS COOLED BY THE SURROUNDING WATER

(75) Inventor: Jürgen Grimmeisen, Stuttgart (DE)

(73) Assignee: Rotinor GmbH, Stuttgart (DE)

( * ) Notice: Subject to any disclaimer, the term of this patent is extended or adjusted under 35 U.S.C. 154(b) by 525 days.

(21) Appl. No.: 11/665,135

(22) PCT Filed: Oct. 7, 2005

(86) PCT No.: PCT/EP2005/010798
§ 371 (c)(1),
(2), (4) Date: Apr. 18, 2008

(87) PCT Pub. No.: WO2006/040078
PCT Pub. Date: Apr. 20, 2006

(65) Prior Publication Data
US 2008/0287016 A1 Nov. 20, 2008

(30) Foreign Application Priority Data
Oct. 12, 2004 (DE) .......................... 10 2004 049 615

(51) Int. Cl.
*B60L 11/00* (2006.01)
*B63H 21/17* (2006.01)
*B63C 11/46* (2006.01)
*B63B 35/73* (2006.01)
*A63B 35/12* (2006.01)

(52) U.S. Cl. ........... 440/6; 440/38; 114/315; 114/55.56; 114/55.58

(58) Field of Classification Search ................ 440/6, 38, 440/49, 66, 68, 111; 114/55.5, 288, 289, 114/56.1, 57
See application file for complete search history.

(56) References Cited

U.S. PATENT DOCUMENTS
2,722,021 A * 11/1955 Keogh-Dwyer .............. 114/315
(Continued)

FOREIGN PATENT DOCUMENTS
DE   1 100 493   2/1961
(Continued)

OTHER PUBLICATIONS
Saft Industrial Bateries, Saft lithium-ion batteries take to the waves, Engineeringtalk, Online, Mar. 2001, URL: http://web.archive.org/web/20040629074917/http://www.engineeringtalk.com/news/sgt/sgt110.html.
(Continued)

Primary Examiner — Daniel V Venne
(74) Attorney, Agent, or Firm — Pauley Petersen & Erickson

(57) ABSTRACT

An electric motor-driven water craft including a fuselage, on which a user can at least partially lie or stand. The fuselage has a flow channel with a screw that is driven by an electric motor and contains the electric motor and batteries, in addition to a control device for the electric motor and the screw, and those items are housed at least partially in the flow channel. This invention provides a higher power for motor-driven water craft of this type by locating the batteries in a water-tight housing. At least some sections of the batteries are in thermally conductive contact with the housing. The housing can be at least partially of a thermally conductive material and/or the electric motor is an internal-rotor motor. The stator is in thermal conductive contact with a housing of the electric motor by a heat conducting unit. At least part of the region of the housing that is assigned to the heat conducting unit can be of a thermally conductive material and the housing can be located at least partially in the flow channel.

38 Claims, 2 Drawing Sheets

U.S. PATENT DOCUMENTS

| | | | |
|---|---|---|---|
| 3,329,118 A | 7/1967 | Strader | |
| 3,408,976 A | 11/1968 | Ellis | |
| 3,543,712 A | 12/1970 | Vasilatos | |
| 3,688,137 A | 8/1972 | Filhol | |
| 3,716,013 A | 2/1973 | Vasilatos | |
| 3,789,788 A | 2/1974 | Peroni | |
| 3,890,920 A * | 6/1975 | Buelk | 440/71 |
| 4,027,617 A | 6/1977 | Ikeda et al. | |
| D289,031 S | 3/1987 | Monostroy | |
| 4,864,959 A * | 9/1989 | Takamizawa et al. | 114/315 |
| D307,258 S | 4/1990 | Monostroy | |
| 4,929,200 A | 5/1990 | Guezou et al. | |
| 5,017,166 A | 5/1991 | Chang | |
| 5,053,658 A | 10/1991 | Fakler et al. | |
| 5,090,929 A | 2/1992 | Rieben | |
| 5,105,753 A | 4/1992 | Chih et al. | |
| 5,158,034 A * | 10/1992 | Hsu | 114/315 |
| 5,379,714 A | 1/1995 | Lewis et al. | |
| 5,388,543 A * | 2/1995 | Ditchfield | 114/242 |
| 5,399,111 A | 3/1995 | Kobayashi et al. | |
| 5,433,164 A | 7/1995 | Sneath | |
| 5,462,460 A | 10/1995 | Kobaysahi | |
| 5,469,803 A | 11/1995 | Gallo | |
| 5,568,783 A * | 10/1996 | Ditchfield | 114/242 |
| 5,704,817 A | 1/1998 | Vaughn | |
| 5,878,687 A | 3/1999 | Grimmeisen | |
| 6,036,555 A | 3/2000 | Takacs | |
| 6,311,631 B1 | 11/2001 | Beecher | |
| 6,325,683 B1 | 12/2001 | Yocom | |
| 6,409,560 B1 | 6/2002 | Austin | |
| 6,461,204 B1 | 10/2002 | Takura et al. | |
| 6,615,761 B2 | 9/2003 | Wyman | |
| 6,682,372 B2 | 1/2004 | Grimmeisen | |
| 7,207,282 B1 * | 4/2007 | Ruan et al. | 114/55.56 |
| 7,329,160 B2 * | 2/2008 | Grimmeisen | 440/6 |
| 2002/0027396 A1 | 3/2002 | Hein et al. | |
| 2002/0119712 A1 | 8/2002 | Grimmeisen | |
| 2004/0185723 A1 | 9/2004 | Grimmeisen | |
| 2005/0181686 A1 | 8/2005 | Grimmeisen | |

FOREIGN PATENT DOCUMENTS

| | | |
|---|---|---|
| DE | 2 100 827 | 7/1972 |
| DE | 3139816 | 11/1985 |
| DE | 35 23 758 A1 | 1/1987 |
| DE | 35 13515 A1 | 10/1988 |
| DE | 39 42 768 | 1/1991 |
| DE | 296 00 675 | 4/1996 |
| DE | 196 27 323 | 1/1998 |
| DE | 199 02 837 C1 | 8/2000 |
| DE | 100 09 278 | 9/2001 |
| DE | 101 58 320 | 6/2003 |
| EP | 0 816 222 | 1/1998 |
| JP | 05058388 A | 3/1993 |
| JP | 05-178268 A | 7/1993 |
| JP | 08-239090 A | 9/1996 |
| JP | 2001-225794 A | 8/2001 |
| JP | 2002362488 | 12/2002 |
| WO | WO 92/00124 A1 | 1/1992 |
| WO | WO 95/31012 | 11/1995 |
| WO | WO 96/30087 | 10/1996 |
| WO | WO 01/62347 | 8/2001 |

OTHER PUBLICATIONS

Multi-Contact AG, Neue Kontaktlamelle LA-CUT im Einsatz, MC News, Online, vol. 2003, No. 1, 2003, p. 1,2, and 8, URL: http://web.archive.org/web/20030928222545/http://www.multi-contact.com/AcroFiles/News/Archiv/News_2003_01_(D)_lo.pdf.

* cited by examiner

ELECTRIC MOTOR-DRIVEN WATER CRAFT, WHICH IS COOLED BY THE SURROUNDING WATER

BACKGROUND OF THE INVENTION

1. Field of the Invention

This invention relates to a motor-driven watercraft, having a body of the craft, on which the user at least partially rests or stands, with a flow channel extending through the body of the craft and containing a screw driven by an electric motor, wherein the electric motor and batteries, as well as a control device for the electric motor and the screw, are at least partially housed in the flow channel.

2. Discussion of Related Art

A motor-driven watercraft is known from PCT International Publication WO 96/30087. In this case, the user lies on the body of the craft and the screw which is in the flow channel is driven by a battery-fed electric motor so that a water flow, which runs opposite the movement direction of the watercraft, is moved by suction through the flow channel.

In this way the water flow can be kept away from the user, and with the shape of the body of the craft, the water flow can be conducted past the user. This makes swimming and diving with the motor-driven watercraft easier.

The known motor-driven watercraft is of a complicated design and, considered from the viewpoint of maintenance, not user-friendly. The electric motor is coupled to the screw by a gear. The electric motor is cooled inside the body of the craft in order to maintain its efficiency. The effectiveness of such a motor-driven watercraft is relatively limited and it has a large weight because of the complicated structure and thus becomes hard to handle.

SUMMARY OF THE INVENTION

It is one object of this invention to provide a motor-driven watercraft of the above mentioned type, which has a high degree of efficiency.

This object can be attained if the batteries are housed in a watertight housing and are in a heat-conducting contact, at least over portions, with the housing, and if the housing at least partially is of a material capable of conducting heat and the housing is in a heat-conducting contact with the flowing water.

The term "rechargeable batteries" is also understood to fall under the term "batteries". In this case, the great amount of heat necessarily generated in the batteries at a high output from the electric motor can be dependably transferred to the water in a simple manner and can be available as a practically unlimited coolant reservoir.

To allow a good heat transfer to the water, the housing can be made at least partially of aluminum. In this connection, the aluminum material is sufficiently corrosion-resistant, in particular in the area exposed to seawater. In one embodiment of this invention for remaining sufficiently dependable in their application also in case of damage, the batteries have a voltage of less than or equal to 60 V. In this case, cooling is particularly suitable for removing the generated heat, which is explained in the example below.

At an output of 4 kW at the driveshaft and an approximate total efficiency of the drive system of 85% (90% motor+5% electronic devices=85% total), the output taken from the batteries is 4.7 kW. The entire system heats up at 45 V over 100 A of a possible continuous current flow. Thus 700 W must be well cooled in spite of the high degree of technical efficiency achieved.

In a further embodiment of this invention, the housing with the batteries is arranged at least in part in the area of the flow channel. A large volume flow of cooling water exists in this area, which aids effective cooling.

In accordance with a further embodiment of this invention, the housing with the batteries can be arranged in a recess formed in the underside of the body of the craft, which is arranged at least partially outside of the flow channel and the inflow opening of the flow channel, and the housing is partially arranged in flowing water on the port and starboard side and/or on the side of the keel. A large-area water flow is thus possible with this arrangement.

The counterbalanced weight arrangement of the motor-driven watercraft in view of an optimum center of gravity can be aided in a simple manner if the housing extends in the direction toward the bow around the center area formed between the bow and the stern of the body of the craft.

The batteries are easily accessible or removable for the recharging process and can be replaced by a fresh housing containing batteries. The batteries of the removed housing can be recharged. In a user-friendly way, the motor-driven watercraft is thus continuously ready for use, which is of particular advantage to rental agencies. The housing for the batteries is watertight and preferably also has a watertight charging jack.

A permanent operation at high efficiency can also be assured in connection with a motor-driven watercraft in accordance with the species if the electric motor has an internal rotor, the stator of the electric motor is in heat-conducting contact with a receiver housing of the electric motor by a heat-conducting unit, in the area assigned to the heat-conducting unit the receiver housing includes at least in part a material capable of conducting heat, and the receiver housing is arranged at least partially in the flow channel. An electric motor thus designed can transfer its heat to the flowing water. Here, the heat conductivity provides a definite and rapid heat removal. It is also possible with this arrangement to omit additional cooling devices, which considerably reduces the parts layout for the motor-driven craft. The electronic control device having the electronic switching arrangement and, if required, output elements, can be cooled in the water in the same way.

The electronic device and the motor preferably form a unit which can be thermally coupled, if desired. In one embodiment of this invention the heat-conducting unit is made of a heat-conducting casting compound, which is in a material-to-material contact with the receiver housing.

Good heat transfer between the stator and the receiver housing of the electric motor is thus created.

In order to be able to refit the electric motor in a simple manner for different output stages, the housing of the electric motor can form a stator receptacle, in which stators in the form of kits which are different, and can be installed, wherein the stators have different extensions, corresponding to different output ranges, in the direction of the axis of the driveshaft of the rotor.

Dependable sealing of the receiver housing is obtained if the rotor and the stator are housed in the receiver housing, which is sealed water-tight against its surroundings. The driveshaft is conducted from the receiver housing through a sealing cassette. The sealing cassette seals the driveshaft by at least two sealing rings, and the sealing cassette can be adjustably arranged in the axial direction in different mounting positions with respect to the driveshaft. The movable sealing cassette makes it possible to assign the sealing rings to different areas of the shaft. This becomes necessary if, after defined length of operations, the sealing rings have worked themselves into the surface of the driveshaft, causing a danger of leakage.

The service life of the driveshaft can be increased if the surface of the running face of the driveshaft on which the sealing rings run off is improved, for example coated with a mechanically resistant material.

Simple leakage monitoring is possible if a leakage sensor is arranged between two sealing rings, or preferably downstream of the redundant sealing rings.

In accordance with this invention, it is possible to provide a combination of the screw, the electric motor and the control device for the electric motor into an underwater unit, and to place it into the flow channel. This results in a substantial reduction in the structure of the parts for the body of the craft, in particular, and for the maintenance of the motor-driven watercraft.

If the body of the craft has a resting surface or a platform for the user, it can be employed in two ways. The construction can be further simplified if the flow channel is formed in one piece out of the body of the craft.

In one embodiment, the flow channel starts with an inflow opening in the area of the bow of the body of the craft and terminates with an outflow opening in the area of the stern of the body of the craft. The underwater drive unit is installed in the flow channel as a thrust and suction device.

In one embodiment the two different types of use of the motor-driven watercraft for prone or standing operation can be distinguished if a remote control device is assigned to the underwater drive unit which is releasably attached to the body of the craft and can be brought into operative connection with the control device of the underwater unit by a radio link.

For simple maintenance or repair of the underwater drive unit, the body of the craft has a plate, flap or the like underneath the underwater drive unit in the flow channel, by which access to the underwater unit is provided.

In one embodiment of this invention, a flow stator is assigned to the screw upstream or downstream in the flow channel in the flow direction, which straightens the rotating water flow in the flow channel at least partially. The flow stator picks up the rotating movement of the water accelerated by the screw and converts it into an additional thrusting force. The stream of water generated strikes the surrounding water without a thrusting force reducing spiral rotary flow, which results in an effective operation and great efficiency. The flow stator is preferably fixedly connected directly with the body of the craft.

A simple construction of the flow stator results if the flow stator has a plurality of guide vanes, which are concentrically arranged in the flow channel. The guide vanes can be arranged around a cone in a manner advantageous for the flow.

For achieving an optimal acceleration of the water moved in the flow channel, the flow stator can be arranged in the area of a water outlet nozzle or diffuser, which tapers in cross section, of the flow channel.

BRIEF DESCRIPTION OF THE DRAWINGS

This invention is explained in greater detail in view of an exemplary embodiment of a motor-driven watercraft represented in the drawings, wherein.

DETAILED DESCRIPTION OF THE INVENTION

Figure 1:
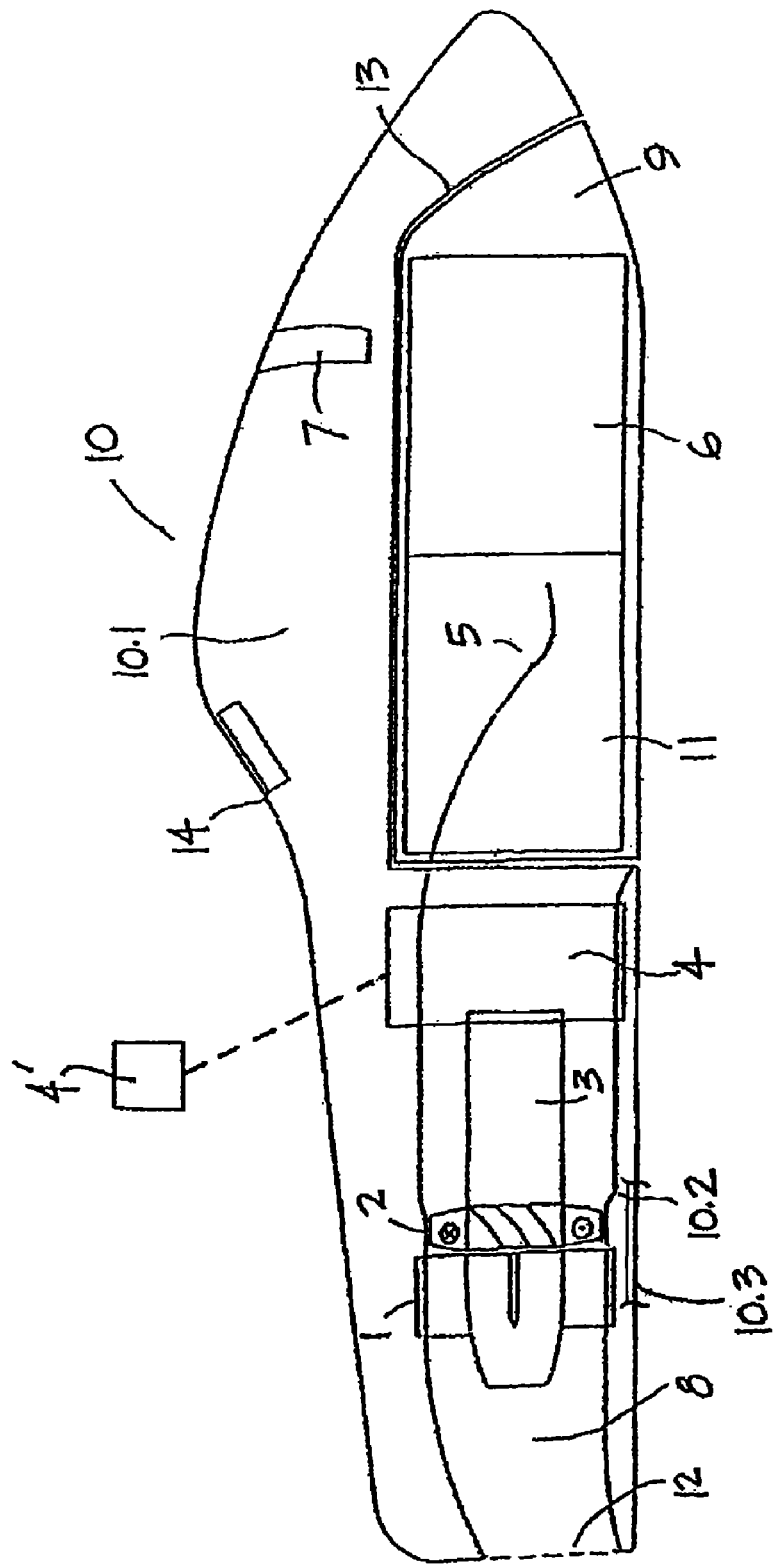
FIG. 1 shows the motor-driven watercraft in a lateral view.

The exterior contours of the body 10 of the craft substantially correspond to the exterior contours of the motor-driven watercraft taught by PCT International Publication WO 96/30087.

The flow channel 8 extends from the inflow opening 11 in the area of or near the bow as far as the outflow opening 12 in the area of or near the stem of the body 10 of the craft. In this case, the inflow opening 11 extends, starting at a center area of the body 10 of the craft, in the direction toward the bow. An underwater drive unit comprising a flow stator 1, an electric motor 3, a screw 2 and a motor control device 4 is installed in the flow channel 8, which is slightly downwardly curved in the area of or near the inflow opening 11 and the outflow opening 12. In the present case, the flow stator 1 is fixedly connected with the body 10 of the craft and directs the rotating water flow generated in the flow channel 8 straight ahead, with as little rotation as possible. An increase in efficiency is thus achieved. The motor-driven watercraft can be designed so that it can be employed in flowing water without reservation. The body 10 of the craft can be freely designed outside of the flow channel 8 and can be designed as simply as possible, but advantageous with respect to flow, and as user-friendly as possible.

The flow channel can be formed in one piece in the body 10 of the craft. In one embodiment, the flow channel 8 is formed from an upper shell 10.1 and a lower shell 10.2. The components are connected with each other by a suitable fastener or fastening means. The flow channel 8 is made accessible for maintenance of the underwater drive unit by removing the lower shell 10.2. However, it is also possible to provide a plate, flap, or the like underneath the underwater drive unit, representatively illustrated by plate 10.3, by which access to the underwater drive unit is provided. A recess 13 is formed in the underside of the body 10 of the craft in the area of the bow of the upper shell 10.1, into which a housing 9 with the batteries 5 and 6 is releasably inserted. The housing 9 with the rechargeable batteries 5 and 6 can be easily and quickly exchanged and can be replaced by a housing 9 with charged batteries 5 and 6, so that the motor-driven watercraft is constantly or always capable of being operated.

The area of the inflow opening 11 of the flow channel 8 can be covered by the housing 9 so that free access to the rotor 2 is prevented, but water can be conveyed at a sufficient flow volume. With this simple step, the rotor 2 can only be accessed when the housing 9 is removed, for example when the electric motor 3 is currentless.

Access to the flow channel 8 can be prevented by blocking elements arranged in the area of or near the inflow and/or outflow opening.

Along both sides, port and starboard, and on the side of the keel, the housing 9 is exposed to flowing water and can be optimally cooled to prevent impermissible heating of the batteries 5 and 6 during operation.

If the user lies prone on the body 10 of the craft, the user can hold onto grip elements 7 or recessed grips. Operating elements of a manual control device 14 can be integrated into one or both grip elements 7.

It is also possible to provide a wireless remote control device 4' that can be connected with the motor control device 4 via a radio link. The manual control device 14, which communicates with the motor control device 4, is maintained on the body 10 of the craft within the field of view of the user. If the user is standing on the body 10 of the craft, the manual control device 14 can be released from the body 10 of the craft and used. Various operational states, for example the actual speed, the diving depth or the charge state of the batteries 5 and 6 can be displayed on it.

The electric motor is designed with an internal rotor which can be installed directly in the flow channel 8 and its heat is dissipated to the flowing water.

The motor control device, which can have the electronic output device and/or a microprocessor, can also be arranged in the flow channel 8 and can be cooled there. Alternatively, the motor control device 4 can be arranged in the water outside of the flow channel 8.

Figure 2:
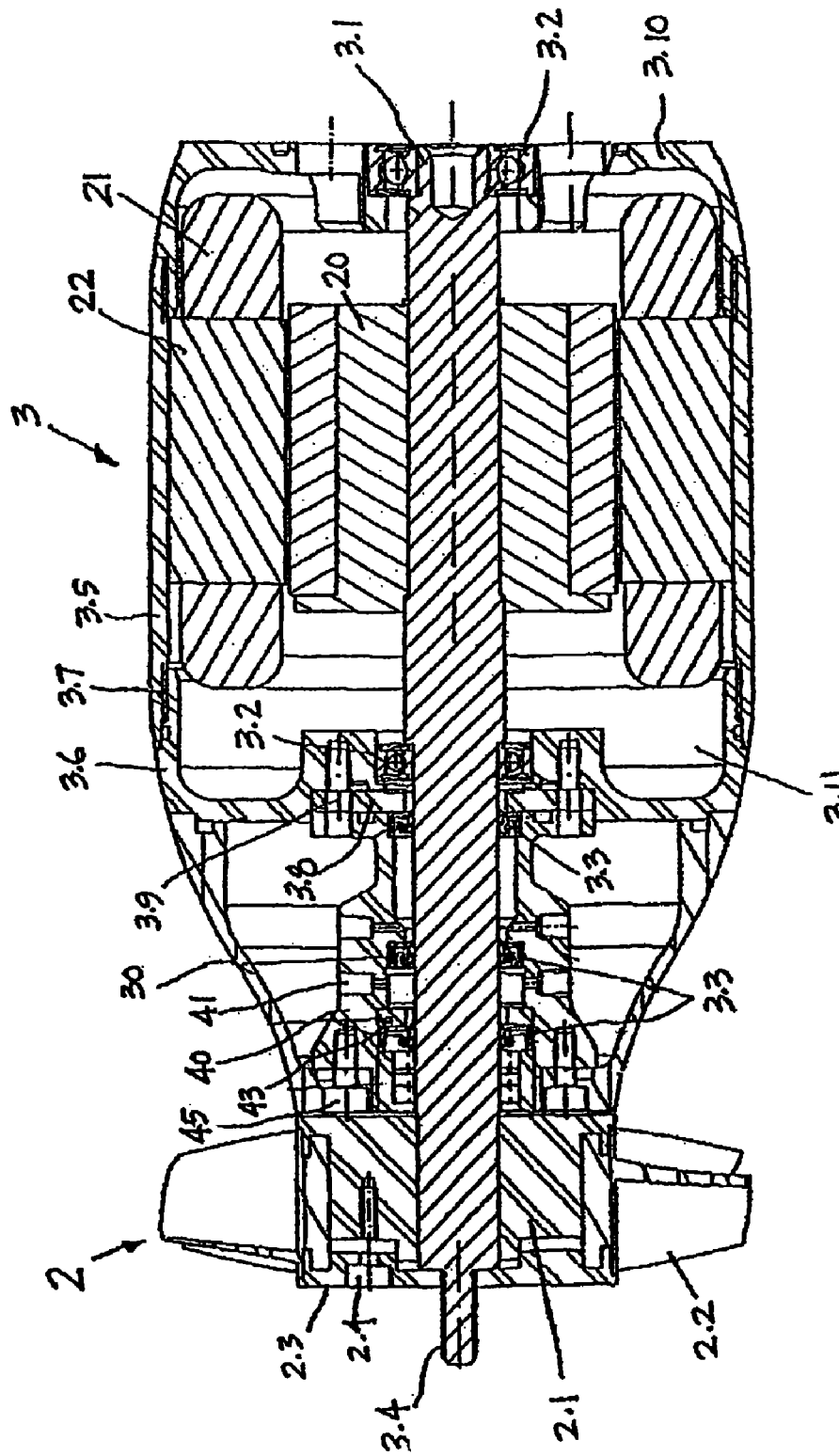
FIG. 2 shows an electric motor of the motor-driven watercraft in a lateral view and in cross section.

The electric motor 3 is shown in detail in FIG. 2. In accordance with this, the electric motor 3 has a driveshaft 3.1, which is seated by two bearings 3.2. At one shaft end, the driveshaft 3.1 has a seating section on which the screw 2 is mounted. In this case the screw 2 is held on the driveshaft 3.1 by a base body 2.1. The base body 2.1 has plug-in receivers, into which the screw blades 2.2 are inserted.

A cover 2.3 is used for fixing the screw blades 2.2 in place in the plug-in receivers and is screwed together with the base body 2.1, such as the screw connection 2.4.

At the end, the driveshaft 3.1 has a threaded section 3.4. A nut can be screwed on it and the screw 2 can be thus fixed.

The screw supports a rotor 20 of the drive motor designed with an internal rotor. A fixed stator 21 is correspondingly assigned. The stator 21 is cast together with the inner wall of a receiver housing 3.5 by a heat-conducting unit 22 made of a casting compound.

The receiver housing 3.5 can be closed off by a housing cover 3.10 arranged on the side of the driveshaft 3.1 facing away from the screw 2. A housing element 3.6 closes off the receiver housing 3.5 on the side facing away from the housing cover 3.10, such as with the screw connection 3.7. The housing cover 3.10 and the housing element 3.6 have bearing receivers for the two bearings 3.2.

A stator receiver 3.11 is formed in the receiver housing 3.5 and extends over a larger area than the one covered by the stator 21. This type of construction also permits the installation of larger stators 21, and rotors 20, so that varying output variations can be created.

In the area of the housing element 3.6, a parts housing 30 is placed in a bell-like fashion over the driveshaft 3.1. A sealing cassette 40 is arranged inside the space enclosed by the parts housing 30 and surrounds the driveshaft 3.1 and seals it with three sealing rings 3.3, such as radial sealing rings. The sealing cassette 40 is sealing connected with the housing element 3.6 by interposition of a spacer 3.8, such as with a screw connection 3.9.

The parts housing 30 is sealingly connected with the receiver housing 3.5. Thus, the parts housing 30 is clamped together with the sealing cassette 40, such as with a screw connection 45.

As FIG. 2 shows, spaces are arranged in the area between the sealing rings 3.3, into which sensors, which can be mounted in sensor receivers 41, project. The sensors can detect water penetrating in case of a leakage.

To prevent the sealing rings 3.3 from working themselves into the associated running face of the driveshaft 3.1, the spacer 3.8 can be replaced after a set length of operation by a spacer 3.8 of a different thickness. The sealing rings 3.3 then get into an unused area of the shaft. As shown in FIG. 2, it is possible to displace only the sealing ring 3.3 facing to screw 2, such as with a spacer 43.

The invention claimed is:

1. A motor-driven watercraft, having a body on which a user at least partially rests or stands and having a flow channel extending through the body for containing a screw driven by an electric motor, wherein the electric motor, batteries, a control device for the electric motor and the screw are at least partially housed in the flow channel, the motor-driven watercraft comprising:

the batteries (5, 6) housed in a watertight housing (9) and in heat-conducting contact with at least a portion of the housing (9), wherein the batteries (5, 6) have a voltage of less than or equal to 60 V, the housing (9) formed at least partially of a material capable of conducting heat and exchangeably connected with the body (10) of the watercraft, the housing (9) in heat-conducting contact with flowing water, and a leakage sensor arranged between at least two sealing rings (3.3).

2. The motor-driven watercraft in accordance with claim 1, wherein the housing (9) is made at least partially of aluminum.

3. The motor-driven watercraft in accordance with claim 2, wherein the housing (9) is arranged at least in part in an area of the flow channel (8).

4. The motor-driven watercraft in accordance with claim 3, wherein the housing (9) with the batteries (5, 6) is arranged in a recess (13) formed in an underside of the body (10) which is arranged at least partially outside of the flow channel (8) and the inflow opening (11) of the flow channel (8), and the housing (9) is partially arranged in flowing water on at least one of a port side, a starboard side and a side of the keel.

5. The motor-driven watercraft in accordance with claim 4, wherein the housing (9) extends in a direction toward a bow of the body (10) around a center area formed between the bow and a stern of the body (10).

6. The motor-driven watercraft in accordance with claim 1, wherein the housing (9) is arranged at least in part in an area of the flow channel (8).

7. The motor-driven watercraft in accordance with claim 1, wherein the housing (9) with the batteries (5, 6) is arranged in a recess (13) formed in an underside of the body (10) which is arranged at least partially outside of the flow channel (8) and an inflow opening (11) of the flow channel (8), and the housing (9) is partially arranged in flowing water on at least one of a port side, a starboard side and a side of the keel.

8. The motor-driven watercraft in accordance with claim 1, wherein the housing (9) extends in a direction toward a bow of the body (10) around a center area formed between the bow and a stern of the body (10).

9. The motor-driven watercraft in accordance with claim 1, wherein the housing (9) is exchangeably connected with the body (10) of the craft.

10. The motor-driven watercraft in accordance with claim 1, wherein the flow channel (8) is formed in one piece out of the body (10).

11. The motor-driven watercraft in accordance with claim 1, wherein the flow channel (8) begins with an inflow opening (11) near a bow of the body (10) and terminates with an outflow opening (12) near a stern of the body (10), and an underwater drive unit is installed in the flow channel (8) as a thrust and suction device.

12. The motor-driven watercraft in accordance with claim 1, wherein a remote control device is releasably attached to the body (10) and is operably connected with the control device (4) by a radio link.

13. The motor-driven watercraft in accordance with claim 1, wherein the screw (2), the electric motor (3) and the control device (4) are embodied as an underwater unit and are placed into the flow channel (8).

14. The motor-driven watercraft in accordance with claim 13, wherein the body (10) has one of a plate, or a flap underneath the underwater drive unit in the flow channel by which access to the underwater unit is provided.

15. The motor-driven watercraft in accordance with claim 1, wherein a flow stator (1) is assigned to the screw (2) one of upstream and downstream in the flow channel (8) in a flow direction, which at least partially straightens rotating water flow in the flow channel.

16. The motor-driven watercraft in accordance with claim 1, wherein the flow stator (1) is fixedly connected with the body (10).

17. The motor-driven watercraft in accordance with claim 1, wherein the flow stator (1) has a plurality of guide vanes concentrically arranged in the flow channel (8).

18. The motor-driven watercraft in accordance with claim 1, wherein the two sealing rings (3.3) seal a driveshaft with respect to a housing for the electric motor.

19. A motor-driven watercraft, having a body on which a user at least partially rests or stands and having a flow channel extending through the body for containing a screw driven by an electric motor, wherein the electric motor, batteries, a control device for the electric motor and the screw are at least partially housed in the flow channel, the motor-driven watercraft comprising:
    the electric motor (3) having an internal rotor,
    a stator (21) in heat-conducting contact with a receiver housing (3.5) of the electric motor (3) by a heat-conducting unit (22),
    in an area adjacent the heat-conducting unit (22) the receiver housing (3.5) formed at least partially of a material capable of conducting heat, and
    the receiver housing (3.5) arranged at least partially in the flow channel (8).

20. The motor-driven watercraft in accordance with claim 19, wherein the batteries (5,6) have a voltage of one of less than and equal to 60 V.

21. The motor-driven watercraft in accordance with claim 19, wherein the housing (9) is exchangeably connected with the body (10) of the watercraft.

22. The motor-driven watercraft in accordance with claim 19, wherein the heat-conducting unit (22) is of a heat-conducting compound which is in contact with the receiver housing (3.5).

23. The motor-driven watercraft in accordance with claim 22, wherein the rotor (20) and the stator (21) are housed in the receiver housing (3) which is sealed water-tight, the driveshaft (3.1) extends from the receiver housing (3.5) through a sealing cassette (40), the sealing cassette (40) seals the driveshaft (3.1) by at least two sealing rings (3.3), and the sealing cassette (40) can be adjustably arranged in an axial direction with respect to the driveshaft (3.1).

24. The motor-driven watercraft in accordance with claim 23, wherein a surface of the driveshaft (3.1) in contact with the sealing rings (3.3) is coated with a mechanically resistant material.

25. The motor-driven watercraft in accordance with claim 24, wherein a leakage sensor is arranged between the sealing rings (3.3).

26. The motor-driven watercraft in accordance with claim 23, wherein a leakage sensor is arranged between at least two sealing rings (3.3).

27. The motor-driven watercraft in accordance with claim 19, wherein the rotor (20) and the stator (21) are housed in the receiver housing (3) which is sealed water-tight against surroundings, the driveshaft (3.1) is conducted from the receiver housing (3.5) through a sealing cassette (40), the sealing cassette (40) seals the driveshaft (3.1) by at least two sealing rings (3.3), and the sealing cassette (40) can be adjustably arranged in an axial direction in different mounting positions with respect to the driveshaft (3.1).

28. A motor-driven watercraft, having a body on which a user at least partially rests or stands and having a flow channel extending through the body for containing a screw on a driveshaft and driven by an electric motor, wherein the electric motor, batteries, a control device for the electric motor and the screw are at least partially housed in the flow channel, the motor-driven watercraft comprising:
    the batteries (5, 6) housed in a watertight housing (9) and in a heat-conducting contact with at least a portion of the housing (9),
    the housing (9) formed at least partially of a material capable of conducting heat,
    the housing (9) in heat-conducting contact with the flowing water,
    two sealing rings (3.3) sealing the driveshaft with respect to a housing for the electric motor, and
    a leakage sensor arranged between at least two sealing rings (3.3).

29. The motor-driven watercraft in accordance with claim 28, wherein the flow channel (8) is formed in one piece out of the body (10).

30. The motor-driven watercraft in accordance with claim 29, wherein the flow channel (8) begins with an inflow opening (11) near a bow of the body (10) and terminates with an outflow opening (12) near a stern of the body (10), and an underwater drive unit is installed in the flow channel (8) as a thrust and suction device.

31. The motor-driven watercraft in accordance with claim 30, wherein a remote control device is assigned to the underwater drive unit which is releasably attached to the body (10) and is operably connected with a control device (4) of the underwater unit by a radio link.

32. The motor-driven watercraft in accordance with claim 31, wherein the body (10) has one of a plate, or a flap underneath the underwater drive unit in the flow channel by which access to the underwater unit is provided.

33. The motor-driven watercraft in accordance with claim 32, wherein the screw (2), the electric motor (3) and the control device (4) form an underwater unit and are placed into the flow channel (8), and the batteries (5, 6) for the electric motor (3) are placed into a separate housing (9) which is one of fixedly and exchangeably installed in the body (10).

34. The motor-driven watercraft in accordance with claim 33, wherein a flow stator (1) is assigned to the screw (2) one of upstream and downstream in the flow channel (8) in a flow direction, which at least partially straightens rotating water flow in the flow channel.

35. The motor-driven watercraft in accordance with claim 34, wherein the flow stator (1) is fixedly connected with the body (10).

36. The motor-driven watercraft in accordance with claim 35, wherein the flow stator (1) has a plurality of guide vanes concentrically arranged in the flow channel (8).

37. The motor-driven watercraft in accordance with claim 36, wherein the flow stator (1) is arranged near a water outlet nozzle which tapers in a cross section of the flow channel (8).

38. The motor-driven watercraft in accordance with claim 28, wherein the batteries (5,6) have a voltage of one of less than and equal to 60 V.

* * * * *